US005233743A

United States Patent [19]

Robertson et al.

[11] Patent Number: 5,233,743

[45] Date of Patent: Aug. 10, 1993

[54] METHOD OF CONSTRUCTION FOR A COMPOSITE WHEELCHAIR CHASSIS

[75] Inventors: A. Scott Robertson, San Francisco; Richard Geiger, Fremont; Robert W. Lishman, LeSelva Beach, all of Calif.

[73] Assignee: Medical Composite Technology, Inc., Soquel, Calif.

[21] Appl. No.: 528,250

[22] Filed: May 24, 1990

[51] Int. Cl.$^5$ .................... B29C 67/14

[52] U.S. Cl. .................... 29/527.1; 156/304.5; 264/257; 264/314

[58] Field of Search .................... 280/250.1; 264/257, 264/258, 314, 317; 29/527.1, 527.2, 527.3; 156/91 X, 304.5 X

[56] References Cited

U.S. PATENT DOCUMENTS

| | | | |
|---|---|---|---|
| Re. 2,242 | 9/1986 | Minnebraker | 280/242 WC |
| D. 254,970 | 5/1980 | Honzyou | D12/131 |
| D. 278,217 | 4/1985 | Nassiri | D12/131 |
| D. 294,476 | 3/1988 | Michel et al. | D12/133 |
| D. 300,733 | 4/1989 | Wagner | D12/131 |
| D. 304,815 | 11/1989 | Jones | D12/133 |
| D. 305,318 | 1/1990 | Danecker | D12/131 |
| 774,042 | 11/1904 | Cooper | 280/80.1 |
| 1,620,657 | 3/1927 | Herold | 16/39 |
| 1,851,843 | 3/1932 | Inman | 403/327 |
| 2,010,306 | 8/1935 | Leech | 155/94 |
| 2,022,348 | 11/1935 | Hoerle | 208/181 |
| 2,797,738 | 7/1957 | Patterson | 155/88 |
| 2,859,837 | 11/1958 | Mize | 188/2 |
| 3,046,181 | 7/1962 | Mann et al. | 156/304.5 |
| 3,189,385 | 6/1965 | Mommsen | 297/429 |
| 3,243,194 | 3/1966 | Trusock | 280/43.12 |
| 3,309,730 | 6/1962 | Heigl | 156/91 |
| 3,337,261 | 8/1967 | Nihlean et al. | 297/44 |
| 3,416,837 | 12/1968 | Saunders | 297/195 |
| 3,486,727 | 12/1969 | Timms | 248/397 |
| 3,852,979 | 12/1974 | Mühlhäusler | 156/91 |
| 3,882,949 | 5/1975 | Anderson | 180/8 A |
| 3,937,490 | 2/1976 | Nasr | 280/242 WC |
| 4,082,348 | 4/1978 | Haury | 297/45 |
| 4,101,143 | 7/1978 | Sieber | 280/42 |
| 4,166,631 | 9/1979 | Sanaski | 280/242 WC |
| 4,169,626 | 10/1979 | Hollar, Jr. | 297/365 |
| 4,224,971 | 9/1980 | Müller et al. | 156/91 |

(List continued on next page.)

FOREIGN PATENT DOCUMENTS

| | | |
|---|---|---|
| 501986 | 5/1954 | Canada . |
| 883578 | 7/1943 | France . |
| 451392 | 8/1936 | United Kingdom . |
| 939012 | 10/1963 | United Kingdom . |

*Primary Examiner*—Jay H. Woo
*Assistant Examiner*—Robert B. Davis
*Attorney, Agent, or Firm*—Burns, Doane, Swecker & Mathis

[57] ABSTRACT

A generally hollow or foam filled, light-weight wheelchair chassis is constructed from composite materials preferably by compression molding using sheet molding compound for volume production, or by resin transfer molding for the production of smaller numbers of units. Each chassis side may be formed in one or two side portions Two-portion side construction is preferred for compression, and the portions may be molded as a left segment and a right segment that are joined vertically, or as an upper segment and a lower segment that are joined horizontally. Joining may be by conventional pin and socket devices, lap joints, or tongue and groove joints. Manufacture by resin transfer molding is preferred when each chassis side is to be made in one-piece. Metallic elements may be placed into the molds prior to curing, or bonded to the chassis following curing. Reinforcing ribs may also be integrally formed with the sides, or separately formed and attached by suitable bonding or attachment techniques. The chassis sides may also be manufactured in one piece from composite materials using reinforced reaction injection molding, structured reaction injection molding, hand layup over foam techniques, and hand layup with internal pressure techniques. The manufactured composite chassis preferably has two longitudinal sides, one or more cross-bars between the sides, and two self-supporting torsion arms extending forwardly and downwardly from the chassis sides and terminating in sleeves for holding casters.

11 Claims, 8 Drawing Sheets

U.S. PATENT DOCUMENTS

| | | | |
|---|---|---|---|
| 4,243,339 | 1/1981 | Dickerson | 403/4 |
| 4,350,227 | 9/1982 | Knoche | 188/2 F |
| 4,351,540 | 9/1982 | Minnebraker | 280/242 WC |
| 4,360,213 | 11/1982 | Rudwick et al. | 280/242 WC |
| 4,371,183 | 1/1983 | Dion | 280/42 |
| 4,380,343 | 4/1983 | Lovell et al. | 280/242 WC |
| 4,392,690 | 7/1983 | Anderson | 301/121 |
| 4,405,142 | 9/1983 | Whetstine | 280/242 WC |
| 4,422,660 | 12/1983 | Costello et al. | 280/304 |
| 4,428,594 | 1/1984 | Minnebraker | 280/242 WC |
| 4,477,098 | 10/1984 | Minnebraker | 280/242 WC |
| 4,477,117 | 10/1984 | Higgs | 297/45 |
| 4,483,653 | 11/1984 | Waite | 414/541 |
| 4,486,048 | 12/1984 | Meyer | 297/433 |
| 4,489,955 | 12/1984 | Hamilton | 280/242 WC |
| 4,500,102 | 2/1985 | Haury et al. | 280/242 WC |
| 4,500,112 | 2/1985 | Raidel | 280/693 |
| 4,506,901 | 3/1985 | Tosti | 280/242 WC |
| 4,570,756 | 2/1986 | Minnebraker et al. | 188/2 F |
| 4,572,576 | 2/1986 | Minnebraker | 297/429 |
| 4,589,525 | 5/1986 | Phipps et al. | 188/2 F |
| 4,592,570 | 6/1986 | Nassiri | 280/650 |
| 4,593,929 | 6/1986 | Williams | 280/650 |
| 4,595,212 | 6/1986 | Haury et al. | 280/242 WC |
| 4,598,921 | 7/1986 | Fenwick | 280/242 WC |
| 4,607,860 | 8/1986 | Vogel | 280/650 |
| 4,648,619 | 3/1987 | Jungnell et al. | 280/650 |
| 4,664,441 | 5/1987 | Collins | 297/183 |
| 4,676,519 | 6/1987 | Meier | 280/242 WC |
| 4,679,816 | 7/1987 | Riikonen | 280/650 |
| 4,693,490 | 9/1987 | Loodberg et al. | 280/650 |
| 4,721,321 | 1/1988 | Haury et al. | 280/242 WC |
| 4,724,115 | 2/1988 | Freeman | 264/314 |
| 4,730,842 | 3/1988 | Summers et al. | 280/638 |
| 4,744,585 | 5/1988 | Huang | 280/646 |
| 4,749,064 | 6/1988 | Jinno et al. | 188/2 F |
| 4,754,987 | 7/1988 | Williams | 280/289 WC |
| 4,768,797 | 9/1988 | Friedrich | 280/242 WC |
| 4,770,432 | 9/1988 | Wagner | 280/242 WC |
| 4,805,925 | 2/1989 | Haury et al. | 280/250.1 |
| 4,813,693 | 3/1989 | Lockard et al. | 280/42 |
| 4,828,781 | 5/1989 | Duplessis | 264/314 |
| 4,840,390 | 6/1989 | Lockard et al. | 280/250.1 |
| 4,852,899 | 8/1989 | Kueschall | 280/250.1 |
| 4,863,771 | 9/1989 | Freeman | 428/36.1 |
| 4,887,826 | 12/1989 | Kantner | 280/250.1 |
| 4,887,830 | 12/1989 | Fought et al. | 280/304.1 |
| 4,889,355 | 12/1989 | Trimble | 280/281.1 |
| 4,891,176 | 2/1990 | Drysdale et al. | 264/250 |
| 4,902,458 | 2/1990 | Trimble | 264/314 |
| 4,917,395 | 4/1990 | Gabriele | 280/250.1 |
| 4,921,271 | 5/1990 | Berry et al. | 280/661 |
| 4,926,777 | 5/1990 | Davis | 280/250.1 |
| 5,020,816 | 6/1991 | Mulholland | 280/250.1 |
| 5,028,065 | 7/1991 | Danecker | 280/250.1 |

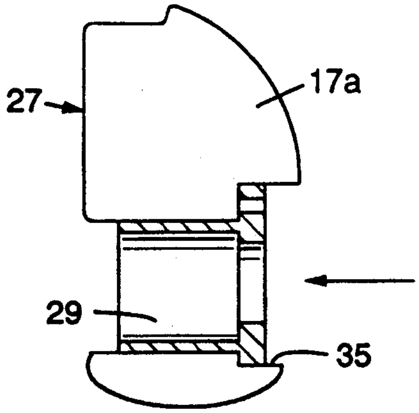
FIG. 5a
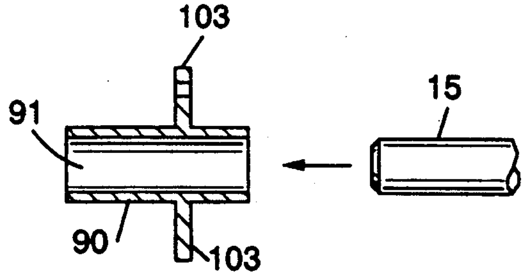
FIG. 6a
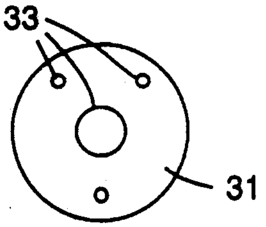
FIG. 5b
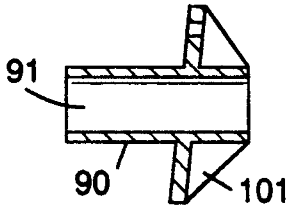
FIG. 6b
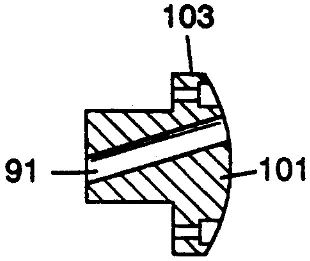
FIG. 6c
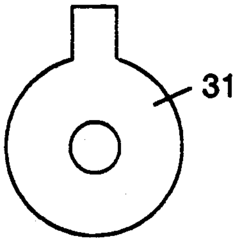
FIG. 5c
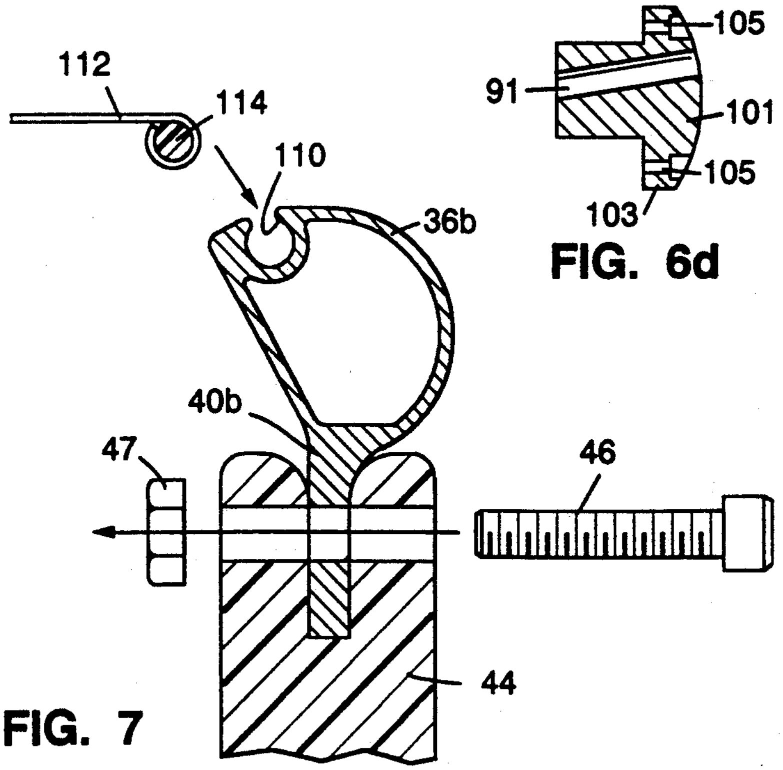
FIG. 6d
FIG. 7

METHOD OF CONSTRUCTION FOR A COMPOSITE WHEELCHAIR CHASSIS

CROSS-REFERENCES TO RELATED APPLICATIONS

U.S. patent application Ser. No. 07/515,120, filed Apr. 27, 1990 relates to a leg rest assembly for a wheelchair. U.S. patent application Ser. No. 07/515,119 filed on Apr. 27, 1990 and now issued as U.S. Pat. No. 5,076,602 relates to a seating system for a wheelchair. U.S. patent application Ser. No. 07/516,057 filed on Apr. 27, 1990 and now U.S. Pat. No. 5,131,672 relates to a camber adjustment fitting for a wheelchair. U.S. patent application Ser. No. 07/516,048 filed Apr. 27, 1990 and now U.S. Pat. No. 5,176,393 relates to a modular wheelchair.

FIELD OF THE INVENTION

The present invention relates to composite material methods of manufacture. More specifically, the present invention relates to the molding of a light weight wheelchair chassis from fiber reinforced resin material.

BACKGROUND OF THE INVENTION

Wheelchairs are well known transportation appliances enabling the infirm, disabled and unwell person to move about with greater mobility than otherwise. Essentially, wheelchairs are small, single person conveyances typified by a chair supported by two outer, large diameter drive wheels behind the center of gravity of the user, and with two smaller swivel mounted wheels or casters located toward the front. Motive power may be supplied by an attendant pushing the wheelchair, by the user's hands and arms applied to the drive wheels, or by an auxiliary power source.

While wheelchairs following many different designs have proliferated, there have been drawbacks heretofore that remain to be solved. In order to meet the needs and demands of the physically handicapped user, wheelchairs must be versatile and easily and readily adapted to accommodate the particular body shape and size of the user. Wheelchairs must also be versatile in adapting to both ambulatory and recreational travel, and they must be sufficiently rugged and durable to provide comfortable passage over uneven and irregular surfaces.

For instance, an unsolved need has arisen for shock and vibration attenuation control for providing extended opportunities and mobility to the user. Another unsolved need has been for a universal, adjustable chassis. Yet another unsolved need has been for a method of manufacture for a wheelchair chassis that enable a variety of preselected chassis specifications to be readily implemented during the manufacture of the chassis. Still one more unsolved need has been for a method of manufacture suitable for both specialized and volume production of a wheelchair chassis.

SUMMARY OF THE INVENTION WITH OBJECTS

A general object of the invention is to provide a method of construction for a wheelchair that overcomes the limitations and drawbacks of the prior art.

A further object of the invention is to provide a molding method of construction for a wheelchair chassis using composite material, the method of construction enabling shock and vibration attenuation specifications to be preselected.

Another specific object of the present invention is to provide a compression molding method of construction using sheet molding compound or resin transfer molding.

Still one more object of the present invention is to provide a compression molding method for producing a wheelchair chassis in volume and preferably from chopped carbon fiber sheet molding compound, carbon preimpregnated reinforcement material, a vinyl ester resin and a glass bead filler.

A further object of the present invention is to provide a resin transfer molding method of manufacture for a composite wheelchair chassis having preselected specifications.

Still another object of the present invention is to provide a molding method of construction for a composite wheelchair chassis wherein each of the chassis sides are of unitary construction.

Yet one more object of the present invention is to provide a molding method of manufacture of a composite wheelchair chassis having self-supporting torsion arms, the arms extending forwardly and downwardly from the sides of the chassis and creating a space therebetween and beneath the wheelchair seat for the storage of optional equipment, such as power packs; the space between the arms enabling the wheelchair leg rest assembly to be selectively positioned therethrough.

Still another object of the present invention is to provide a molding method of construction for a composite wheelchair chassis wherein each of the integral chassis sides is formed by joining at least two side segments.

In accordance with the principles of the present invention, a generally hollow or foam filled, wheelchair chassis is constructed from composite materials using molding techniques, preferably compression molding using sheet molding compound for volume production, or using resin transfer molding for the production of smaller numbers of units.

The chassis sides are molded from shock and vibration attentuating composite materials, such as a carbon fiber reinforced polymerized epoxy resin or other suitable material preselected in conformity with the desired specifications of the chassis. Each chassis side may be formed in one or two side portions. Two-portion side construction by compression molding using sheet molding compound is preferred, and the portions may be molded as a left segment and a right segment that are joined vertically, or as an upper segment and a lower segment that are joined horizontally. Manufacture by resin transfer molding is preferred when each chassis side is to be made in one-piece.

The preferred sheet molding compound for compression molding is a combination of carbon fibers and preimpregnated reinforcing tape with a vinyl ester resin and glass bead filler. The compression molding from the sheet molding compound is accomplished at approximately 150–450 degrees F. The selected sheet molding compound is placed into heated, pressurized compression molds until cured. Metallic elements may be placed into the molds prior to curing, or bonded to the chassis following curing. The chassis sides and cross-bars are of a generally hollow construction or may be foam filled and/or reinforced with bonded-in ribs. The ribs may also be integrally formed with the sides, or separately formed and attached by suitable bonding or attachment techniques. Preferably the two pieces of the chassis sides are formed so as to be joined horizontally in a tongue and groove arrangement, or in a single overlap configuration, or by a pin and mating socket mechanism.

Manufacture of each chassis side in one piece from composite materials may be accomplished using resin transfer molding, reinforced reaction injection molding, structural reaction injection molding, hand layup over foam techniques, and hand layup with internal pressure techniques. The preferred resin transfer molding method of construction employs a preform construction from a variety of fibers held together with an adhesive substance and formed on a foam core, a blank or a mandrel. The formed preform is placed in the mold and conventional injection molding techniques are used to complete the composite structure. Attachment structures for the castor wheels and wheel attachment mechanism may be molded into the chassis sides during construction. Other molding techniques, such as hand layup methods and those employing internal pressure may to used to construct the composite chassis.

The manufactured composite chassis preferably has two longitudinal sides, one or more cross-bars between the sides, and two self-supporting torsion arms extending forwardly and downwardly from the chassis sides and terminating in sleeves for holding casters. When attached to the other wheelchair components, the arms create a space therebetween and under the wheelchair seat for storage of optional items. A generally C-shaped hollow rear cross-bar may be used and fitted with optional battery powered drive motors for independently driving the drive wheels of the wheelchair.

In one more aspect of the present invention, the cross-bars are composite material or metal and adjustable thereby permitting the width of the chassis to be adjusted to accommodate users of different sizes, and to accommodate different sized seating systems. In this aspect the chassis may be disassembled into two pieces thereby increasing the collapsibility of the wheelchair.

In another aspect of the invention, each longitudinal side is constructed to accommodate two vertically extending posts for attaching a seat, the posts providing an independent height adjustment mechanism for enabling the height or angular position of the seating system to be adjusted relative to the chassis or to the floor plane.

In still another aspect of the invention, each longitudinal side is constructed to include one or more recesses containing mounting devices for attaching the drive wheels, the travel wheels and the anti-tip wheels.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. **5*a* is a cross sectional, enlarged frontal view of the wheel attachment mechanism of the chassis and taken along the lines 5—5 in FIG. 4. FIG. 5*b* is an enlarged side view of the interior of the chassis wheel attachment mechanism bearing a pattern of holes. FIG. 5*c*** is an enlarged side view of a keyway mechanism for the attachment of the wheel mechanism.

FIGS. **6*a*, 6*b*, 6*c* and 6*d*** show a series of exchangeable drive wheel attachment plugs for securing the drive wheel to the drive wheel attachment mechanism of the chassis.

Figure 1:
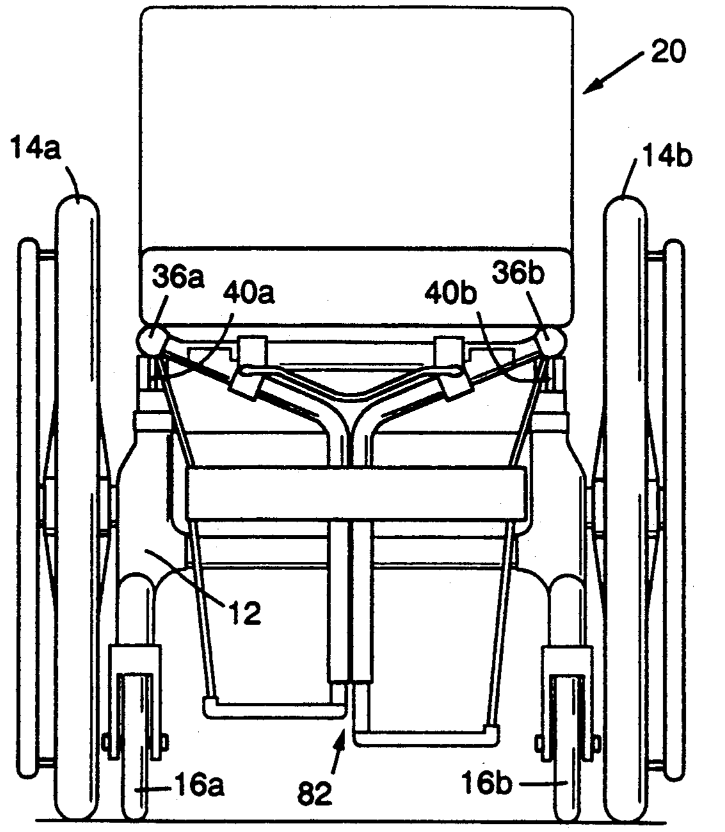
FIG. 1 is a front view in elevation of a wheelchair incorporating a chassis of the present invention.
Figure 8:
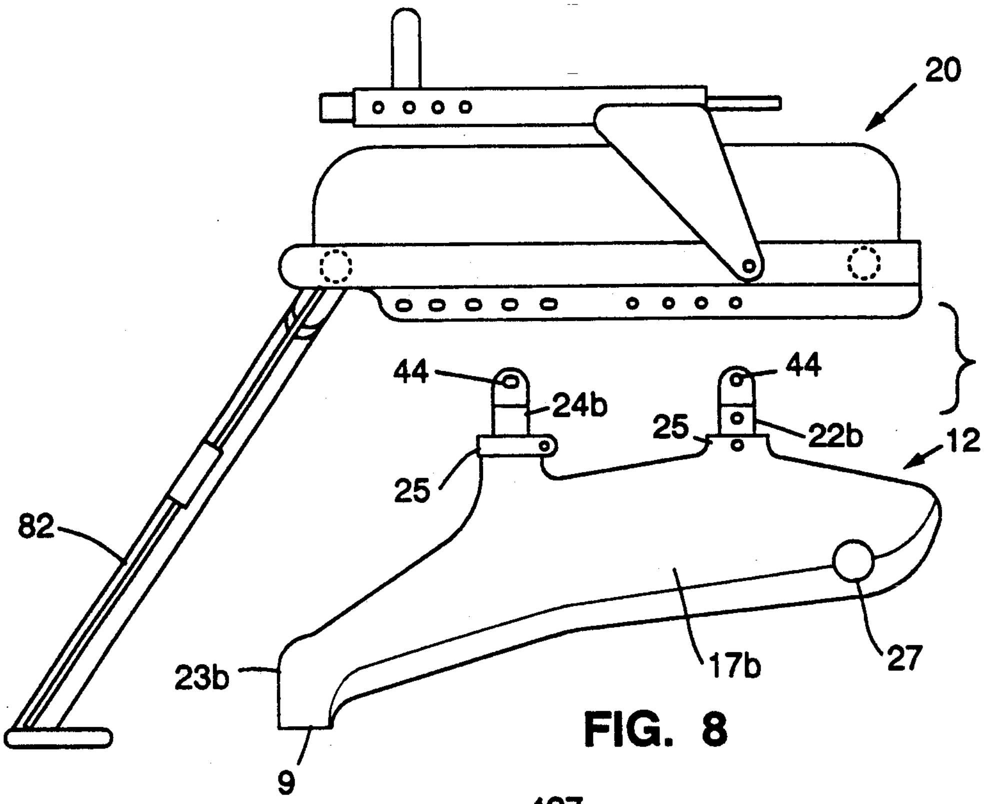

FIGS. 7 and 8 are somewhat diagrammatic side views in elevation of the FIG. 1 chassis detached from the seating system, with the seat back folded down against the seat cushion, with the leg and foot rest extending downwardly and outwardly in a normal use position, and showing the posts for attachment of the seating system.

Figure 9:
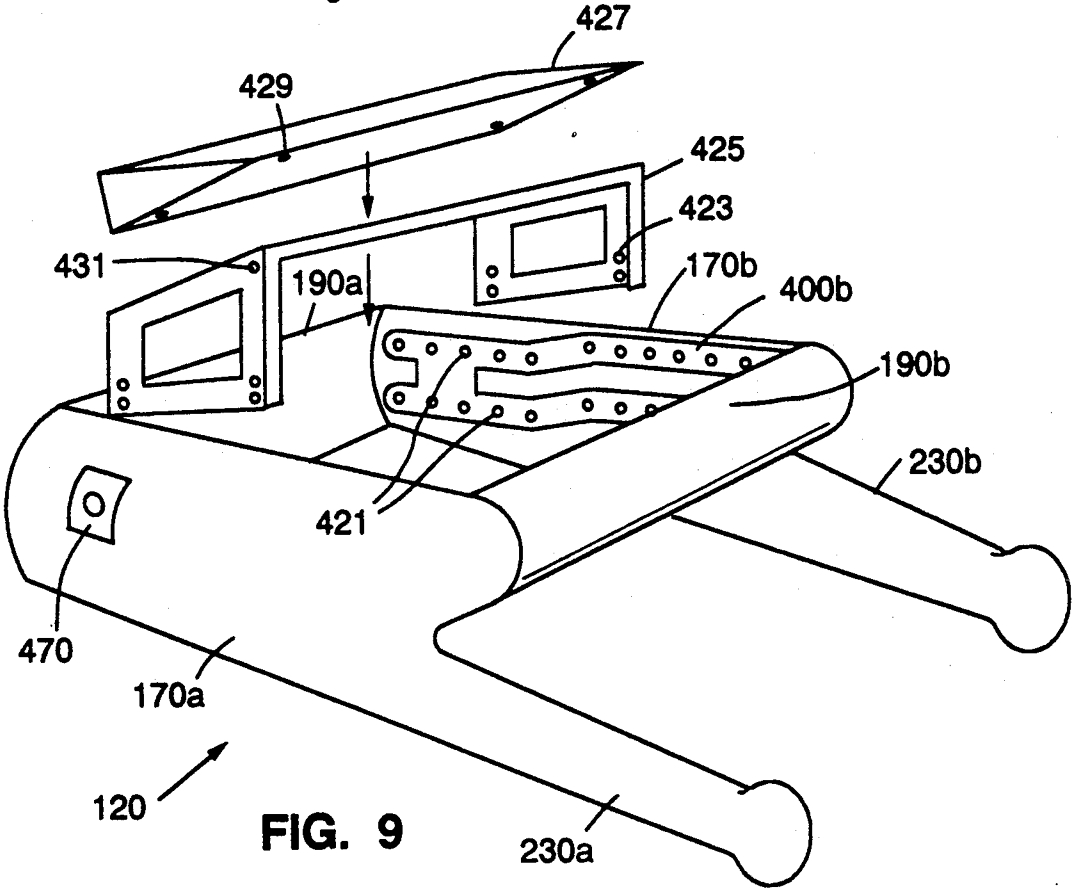

FIG. 9 is a perspective view in elevation of an aspect of the present invention wherein mounting rails are attached to the chassis to mount the wheelchair seat.

FIG. **10*a*** is a front cross-sectional view of the chassis side illustrating the vertical joint for connecting the two segments forming the chassis side.

FIG. **10*b*** is a front cross-sectional view of the chassis side illustrating the horizontal joint for connecting the two segments forming the chassis side.

FIG. **10*c*** is a front cross-sectional view of the chassis side illustrating the composite ribs.

FIG. **10*d*** is a perspective view of a portion of the two segments forming the chassis side illustrating the mating male pins and female sockets for joining the two segments.

Figure 11:
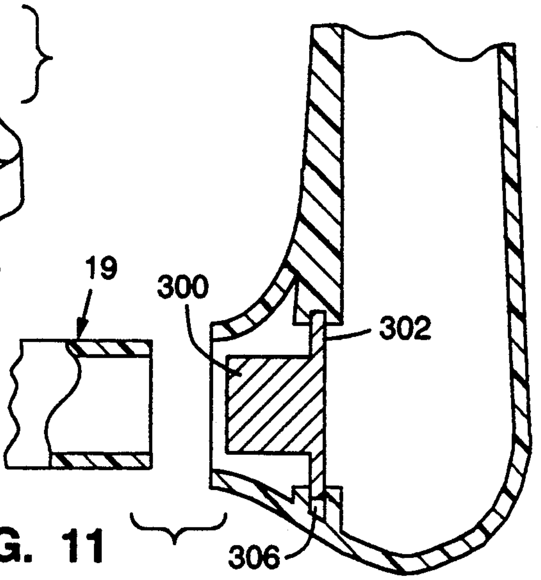

FIG. 11 is a cross-sectional view of the chassis showing a tongue and groove configuration for connecting a mounting boss for mounting a cross-bar to the chassis side.

FIGS. **12*a*, 12*b* and 12*c*** show a method of joining a cross-bar into a recess formed in the chassis side.

Figure 13:
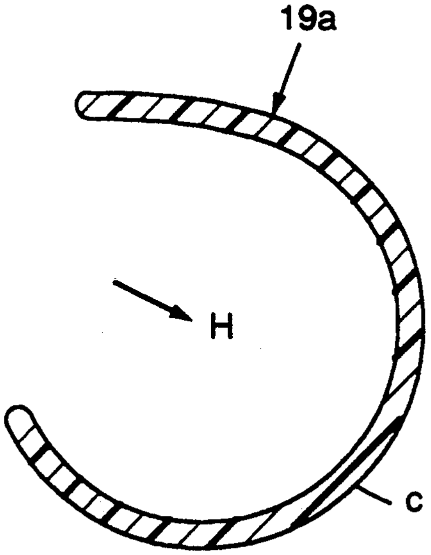

FIG. 13 is a sectional view of a hollow generally C-shaped rear cross-bar of the chassis.

Figure 14:
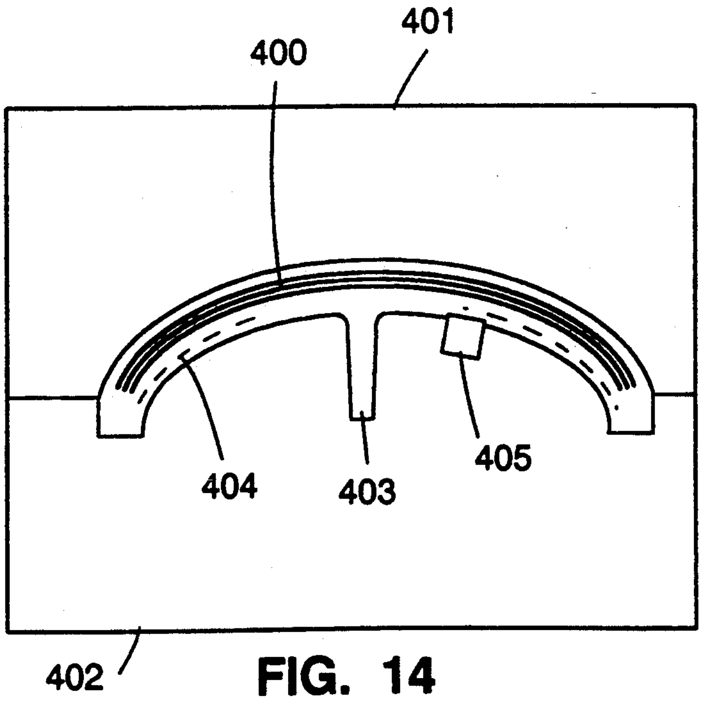
Figure 15A:
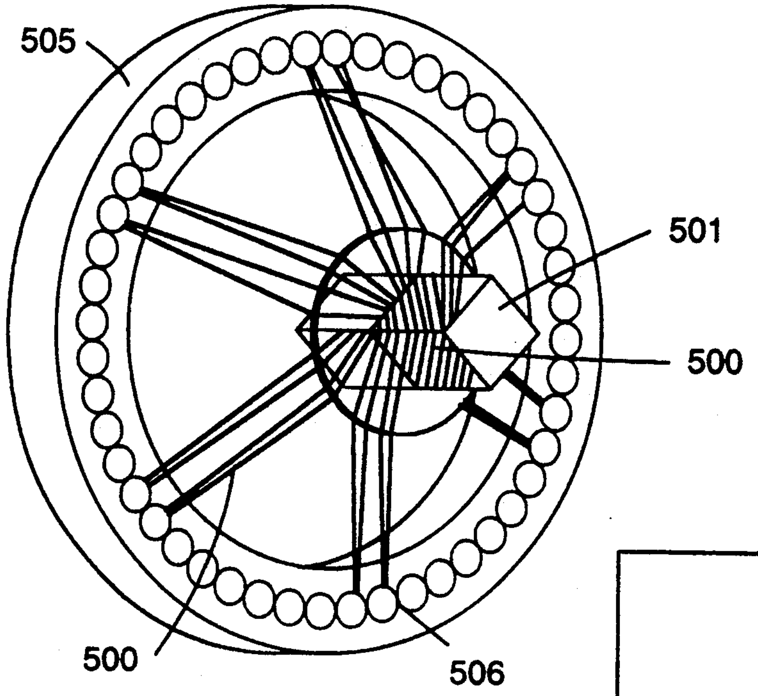
Figure 15B:
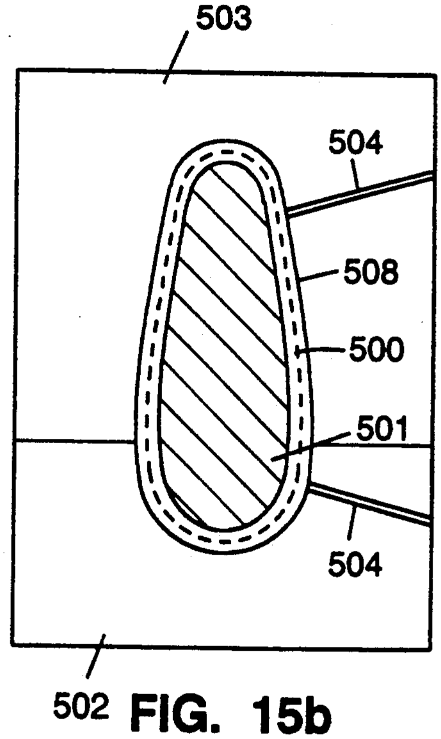

FIG. 14 is a cross-sectional view of a compression mold for forming the chassis from sheet molding compound.

FIGS. **15*a* shows formation of a preform by braiding on a mandrel, and 15*b*** shows an injection mold for forming the chassis using resin transfer molding.

FIGS. **16*a* and 16*b*** are hand layup molding methods for forming the chassis.

FIGS. **17*a*, 17*b* and 17*c*** are internal pressure methods for forming the chassis following the hand layup molding methods for forming the chassis.

Figure 18:
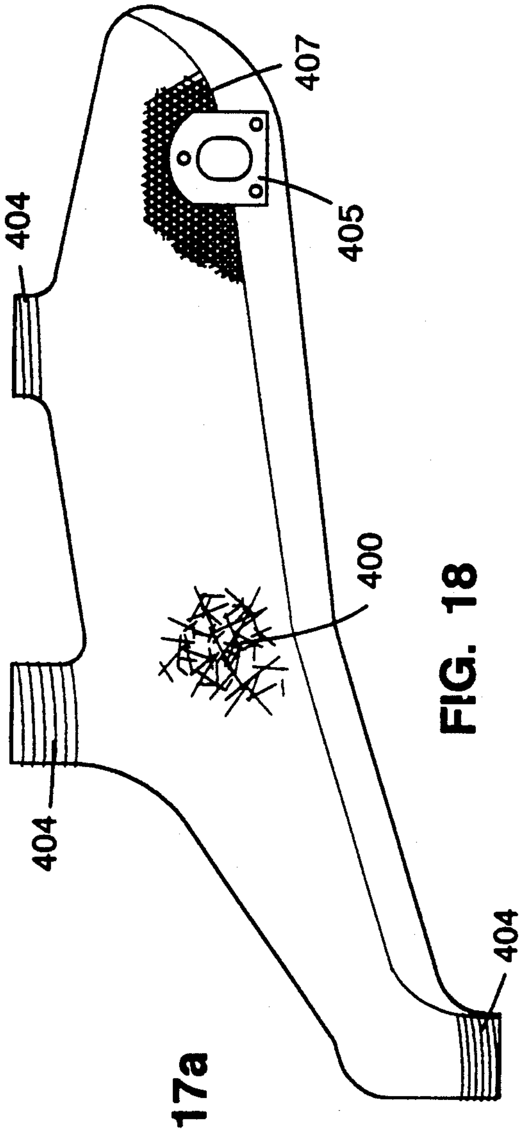

FIG. 18 is a side view of the chassis of the present invention showing an SMC charge, and prepreg tape and cloth reinforcement of the chassis.

Figure 19:
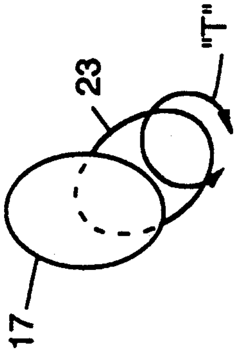

FIG. 19 is a front view of the radially offset arm portion of the chassis side, showing the locus of torsion resistance of the chassis arm.

Figure 20:
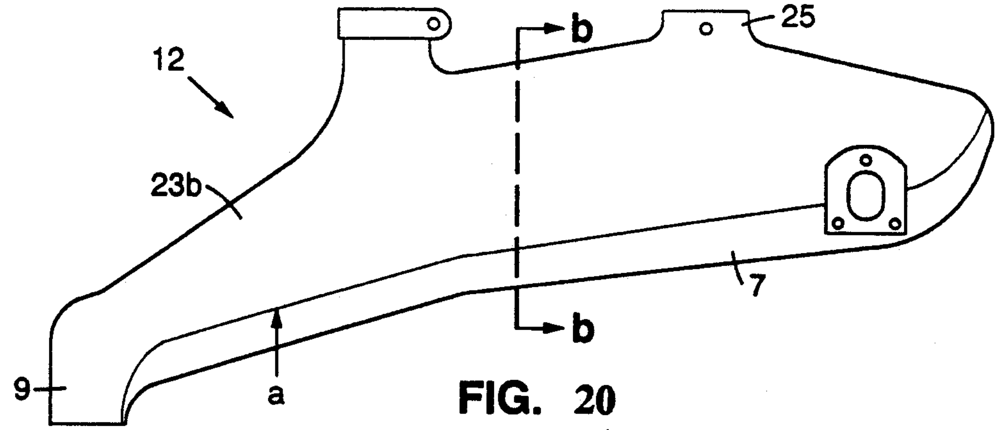

FIG. 20 is a side view of an embodiment of the present invention having an elastomer cover bonded to the bottom of the chassis and showing two joining lines for joining the two segments of the chassis side.

DETAILED DESCRIPTION OF PREFERRED EMBODIMENTS

Figure 2:
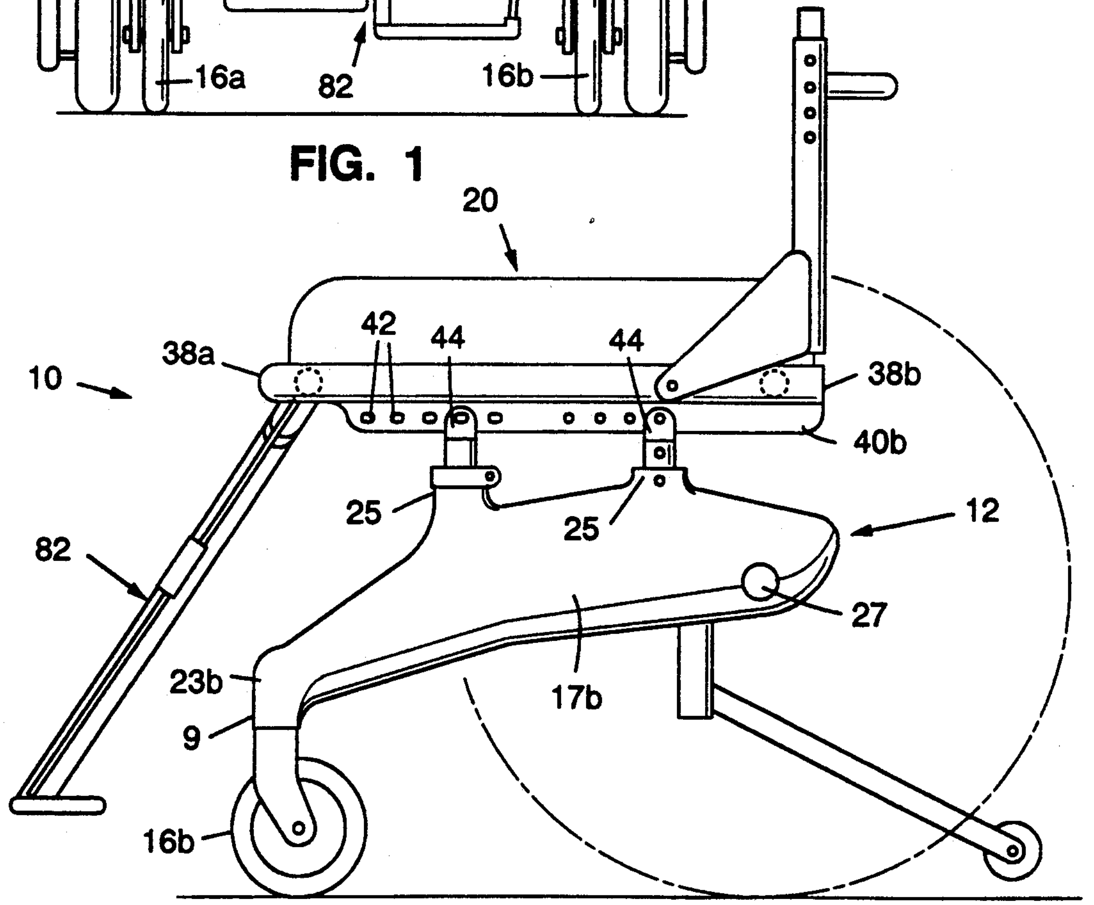
FIG. 2 is a somewhat diagrammatic side view in elevation of the wheelchair and chassis thereof, with the drive wheel shown in phantom outline for clarity.

Referring to FIGS. 1 and 2, the chassis 12 of the present invention is shown attaching additional components of the wheelchair 10, including two large drive wheels 14*a* and 14*b*, a seating system 20, a leg rest assembly 82, and casters 16*a*and 16*b*. Additional, optional equipment includes travel wheels (not shown), anti-tip wheels and wheel locks, and a variety of specialized seats.

In accordance with the principles of the present invention, the generally hollow or foam filled, wheelchair chassis 12 is constructed from composite material using molding techniques, preferably compression molding using a sheet molding compound or resin transfer molding. The chassis includes two longitudinal sides and each side may be of one or two-piece construction from a variety of composite materials and may be tailored to preselected shock and vibration attenuating specifications. All surfaces are contoured to provide a rounded, snag free, smooth, aerodynamic and streamlined appearance to the chassis 12.

Compression molding using sheet molding compound is known in the art to be applicable to volume production and is therefore preferred when the chassis of the present invention is manufactured in quantity. Resin transfer molding is the preferred method of manufacture for a chassis having preselected size or performance specifications.

Figure 10A:
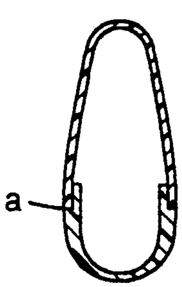
Figure 10B:
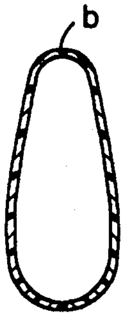

For compression molding using sheet molding compound (SMC), each of the chassis sides is preferably formed in two portions from a composite material containing 25% to 80% by volume fiber, resin and filler. The chopped fiber to be used is generally from approximately ¼" to 3" in length. Longer fibers impart greater strength to the composite material, but do not flow as well into the complex contours or into the hollows for internal ribs. When longer non-flowing fiber is needed for reinforcement , preimpregnated continuous length cloth or uni-directional tape (prepreg) can be added locally to increase or tailor the strength, bending, stiffness, torsional characteristics, etc. of the part. The prepreg is added to the SMC charge in a predetermined amount, shape and location prior to closing the molds. When the charge is compressed in the mold, the prepreg and the SMC melt together to become a composite of short and long fibers held together by a solid, cured resin matrix. The prepreg is not used when it is not needed because it is more labor intensive and costly than the use of the SMC charge by itself. The SMC fibers and the fibers of the prepreg may be S-glass, E-glass, carbon, KEVLAR (tm), aramid, or other similar substances or combinations thereof. KEVLAR is a polyamide and a trademark of DuPont. The selected fiber or combination of fibers, is mixed with a resin of epoxy, polyester, vinyl ester, or other suitable substance. A glass bead, mineral, or other suitable filler is added to the SMC fiber-resin combination to form the sheet molding compound. The preferred sheet molding compound is a combination of ¼" to 3" carbon fibers, having approximately 65% fiber volume, with a vinyl ester resin and glass sphere filler. Referring now to FIG. 14, the prepared sheet molding compound 400 is placed in a compression mold constructed from composite material, aluminum, ceramic material, steel or another suitable substance. Presently, a chrome plated steel mold is preferred and consists of a mold top 401 and a mold base 402. The mold base 402 may be formed with cavities 403 for ribs and metal inserts to be molded into the chassis side. The mold for each chassis side may be unitary, or in the preferred method, may consist of two portions to form each, longitudinal side of the chassis. Referring now to FIG. 20 and 10*a*, the two-piece molds may be shaped so that the chassis side is formed by bonding an upper segment and a lower segment at a selectable, horizontal part line "a", or the molds may be a right segment and a left segment that are bonded together at a vertical part line "b", as shown in FIGS. 20 and 10*b*.

The top 401 and the base 402 of the molds are heated to temperatures of approximately 100 to 450 degrees Fahrenheit. The selected SMC charge 400 is generally contained on plastic sheets, such as MYLAR (tm), which are cut or stamped to the approximate shape of the mold. The sheets are placed into the mold so that approximately 80% of the mold is covered, and the plastic backing sheet is removed. The SMC may be added in layers to the desired thickness which is preferably 1/16" to ¼". A representative sample of the preferred fiber, 65% carbon fiber volume ¼" to 3" random SMC charge is shown in FIG. 18 as number 400. FIG. 18 also shows uni-directional impregnated tape or cloth 404 wrapped around the seat attachment post areas and the castor attachment area of the mold to an approximate thickness of 1/16". Impregnated cloth 407 may be added to the mold in the area used to attach the drive wheels. Preferably, continuous length carbon fiber cloth or tape is used to tailor the strength and stiffness of the chassis to preselected specifications. Metal parts or elements 405 of the chassis, such as the post clamping mechanisms, the castor wheel attachment mechanisms, and the mounting plate for the drive wheel mechanism, may be added to the molds and their point of attachment to the chassis side reinforced with the impregnated cloth or tape so that these devices are molded into the chassis sides during the cure.

Figure 10C:
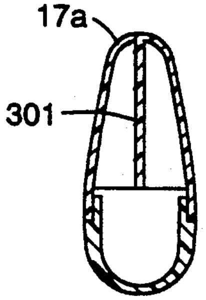
Figure 10D:
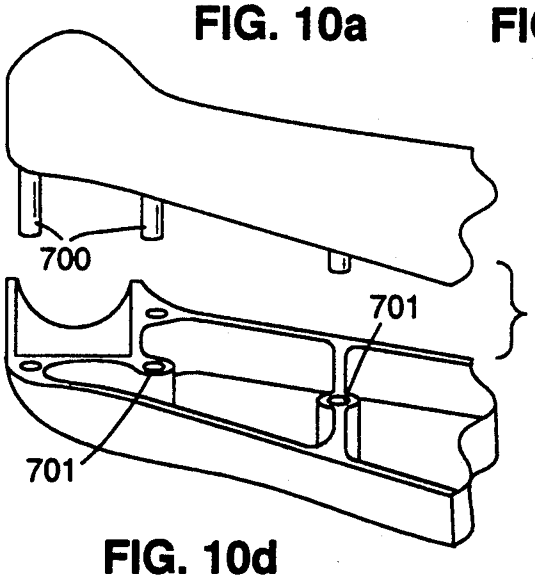
Figure 12A:
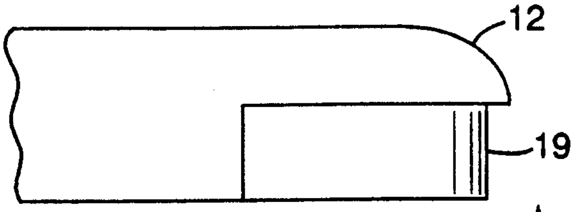
Figure 12B:
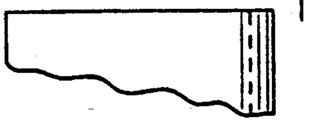
Figure 12C:
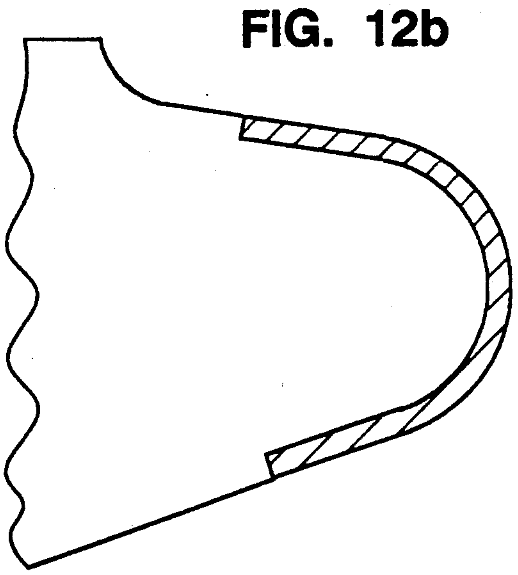

The sheet molding compound 400 is then placed onto the reinforced formed pattern of the mold base 402 in the predetermined quantity and shape. The mold top is next closed, the mold pressure is maintained at approximately 300 to 1000 psi and the selected temperature is maintained until the composite material has cured. Curing is presently accomplished in approximately 1 to 5 minutes. Following cure, the composite segments of each side are trimmed if needed and then are joined as shown in FIGS. 10*a* -10*c* by adhesive bonding. The bonding may use a single overlap joint fastening, as shown in FIGS. 10*a*-10*c*. Alternatively as shown in FIG. 10*d*, the segments may be joined by providing male pin devices 700 on one segment that attach within mating female sockets 701 provided on the other segment of the chassis side. The pin 700 and socket attachment mechanism may be provided at any of the attachment areas of the chassis segments or unitary sides. A preferred tongue and groove attachment for a mounting boss 300 may be provided as shown in FIG. 11 for attaching a cross-bar 19 to the chassis side. The metallic or composite mounting boss 300 includes flanged shoulders 302 which fit into the grooves 306 formed in the chassis segments, and the cross-bar 19 may be mounted onto the mounting boss 300. The cross-bar 19 may also be joined to the chassis 12 by bonding it into a recess as shown in FIGS. 12*a*-12*c*. As shown in FIG. 10*c*, one or more shell reinforcing ribs 301 made from composite material may also be added to each side segment and bridged to the other side segment to provide strength and additional gluing points for bonding each side segment together. Pins 700 and sockets 701 may also be included in the reinforcing ribs 301, as shown in FIG. **10*d***. Other metal inserts may be bonded into the formed chassis. Foam may be added to the chassis's generally hollow sides to quiet the ride through resonance reduction, or to add strength.

For manufacture using resin transfer molding (RTM), each chassis side can be made in one or two pieces. With RTM, a dry fiber reinforcing preform over a foam core, blank or mandrel is placed into the bottom half of a two part heated mold. The mold is then closed with the top and a catalyzed low viscosity resin is pumped in under pressure displacing the air until the mold is filled. The chassis part cures in the mold in 10 to 20 minutes. The part is then removed and trimmed if necessary. The fibrous preform can be made of E-glass, S-glass, carbon, aramid, or any combination thereof. The preform can be made of short fiber and adhesive blown together onto a mandrel, or continuous fibers wound around a mandrel, or continuous fibers braided over a mandrel, or cloth cut into pieces and loaded into the mold. Chopped fiber RTM production is cost effective and economically preferred. Braided RTM production is less cost effective, but results in a relatively stronger and lighter weight chassis. The mandrel is a form or mold shaped to conform to the inside contour of the part to be molded. The outer diameter of the mandrel corresponds in size and in shape to the inner diameter and shape of the desired, finished part. The preferred preform is made of a 60% to 70% fiber volume continuous length carbon fiber braided over a skinned foam mandrel forming the chassis side in one piece. The chassis sides may also be molded in segments and bonded together, see FIGS. **10*a* and 10*b***.

To make the sides in one piece by RTM, a skinned foam mandrel is covered with the fibrous preform and loaded into a mold. The resin is pumped in and encases the fibers without being absorbed into the foam. The completed part has a lightweight foam core. With all preforms except that using chopped fiber, the fibers are arranged in layers with varying angles and thicknesses in a predetermined manner to tailor the strength and stiffness to selected requirements.

Referring now to FIG. **15*a*, the preferred preform 500 is braided over and around a skinned foam mandrel form 501 having the desired shape of the inside contour of the chassis side and mounted on a braiding machine 505. The braiding machine 505 includes multiple yarn carriers 506 for dispensing the preform 500. The dispensed preform 500 is braided down and back along the mandrel form 501. The braided preform is added to and placed around the mandrel 501** to the desired thickness. Selected areas, such as the areas of each side to which the seat assembly and the drive wheel assembly will be attached, may be selectively reinforced by adding additional unidirectional tape or cloth under the braid. Reinforcement may also include altering the angle of application, relative to the axis of the chassis side, and the weave of the preform in high stress areas. The mandrel is encased in a manner that conforms to preselected chassis specifications.

Referring to FIG. **15*b*, the encased mandrel 501 is next loaded into a mold having the contour 508 of the mandrel 501 and constructed from composite material, aluminum, ceramic material, steel or another suitable substance. Presently, a composite material mold is preferred and consists of a mold base 502 and a closable mold top 503. The mold is preheated to temperatures from approximately 100 to 450 degrees Fahrenheit. The top is closed over the mold base and a relatively flowable low viscosity resin is injected into the mold through one or more injection ports 504** in the mold, and at low pressure of approximately 100 psi. Epoxy resin is presently preferred, although polyester, vinyl ester or other suitable thermoplastic or thermosetting resins may be used. Following cure and cooling, the molded chassis side is removed from the mold, trimmed, and the desired metal parts or inserts, such as the snap mounts for the swivel caster wheels and the attachment mechanisms for the seating assembly and the drive wheels, are bonded to the side using epoxy or other suitable substances. Alternatively, the metal parts or inserts may be positioned into the prepared mandrel prior to injection of the resin.

The chassis sides may also be made in one piece using reaction injection molding (RIM). A preform is made essentially as described above in connection with resin transfer molding; however, the fiber volume is less than the fiber volume employed in resin transfer molding. The preform is formed over the mandrel and the mandrel is placed into the heated mold and a higher viscosity resin is injected under low pressure. The chassis sides cure in the mold. The difference between RIM and RTM is that the SRIM uses a faster curing higher viscosity resin and is therefore preferred for volume production. To aid the flow of the resin or to increase the fiber volume, the mold can be left open initially when the resin is pumped in so that the resin has more room to flow. Once the preform is almost covered, the mold is closed and the part cured.

Figure 16A:
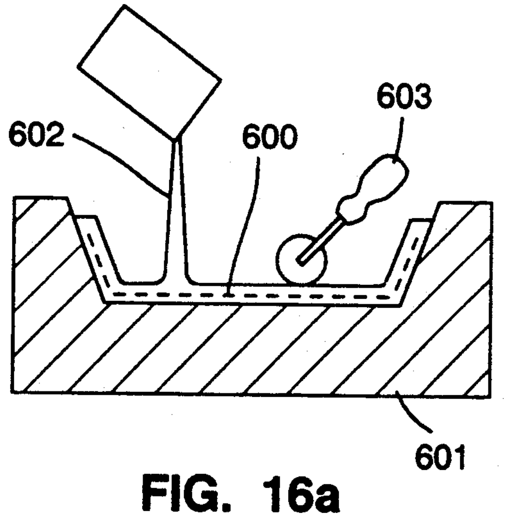
Figure 16B:
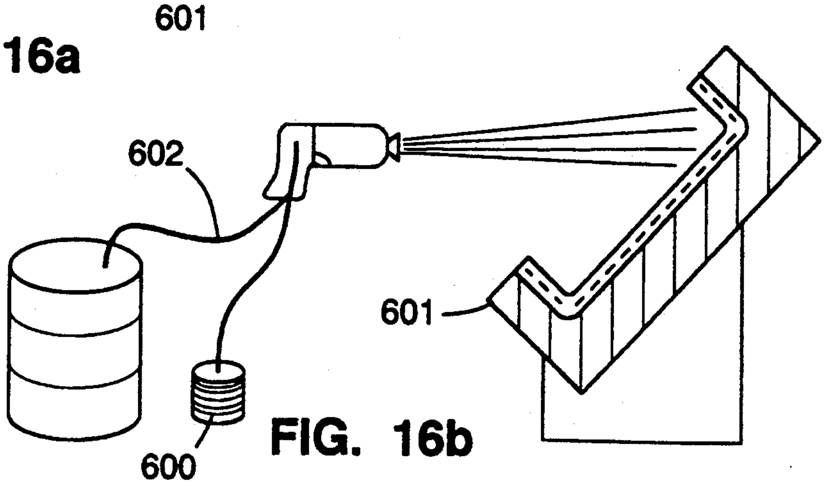

Each chassis side may also be formed in one piece using hand layup techniques as shown in FIGS. **16*a*–16*c*. The dry selected fiber or combination of fibers 600 is placed into an open mold 601 and the selected resin 602 is poured, brushed or sprayed over the fiber. External pressure can be applied by rollers 603 or other compaction devices or vacuum bags to press out trapped air and to compact the fiber resin mixture. Alternatively, the fiber and resin may be premixed and sprayed into the mold as shown in FIG. 16*b***, or a preimpregnated fiber cloth or tape may be pressed into the mold or onto a foam form. The hand layup techniques can be room temperature or oven cured.

Figure 17A:
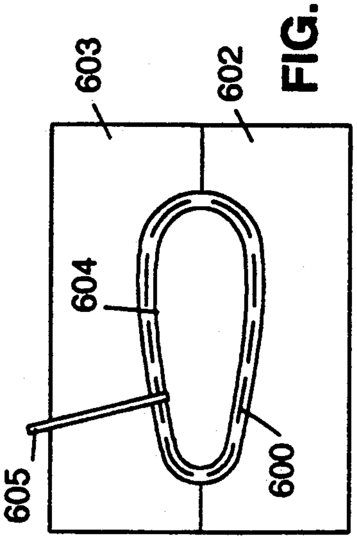
Figure 17B:
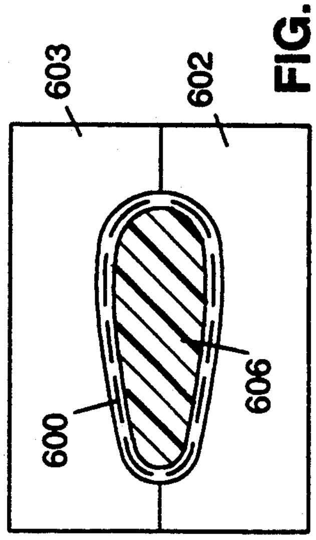
Figure 17C:
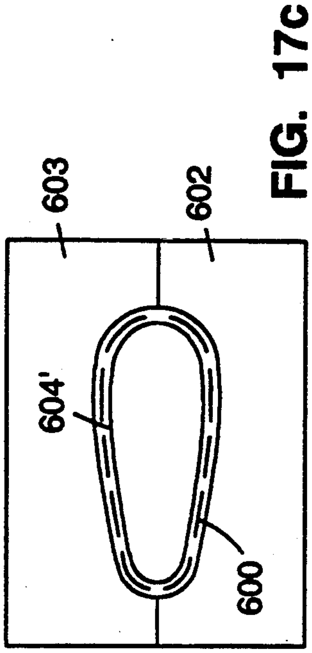

Internal pressure may be applied to hand layup molding techniques by using an inflatable bladder 604 or balloon, as shown in FIGS. **17*a*–17*c*. Following placement of the fiber or prepreg 600 in the mold 602 and 603 and addition of the resin, the air bladder 604 is placed over the mixture and inflated through an external port 605 to compress the mixture to the mold. The bladder 604 or balloon is formed from a flexible film or a plastic material and may contain a nipple and valve (not shown) for injecting the air. A sealed bladder 604' can also be used as sown in FIG. 17*c*, and is filled with a predetermined amount of a gas that expands to give the desired internal pressure when heat is added tot he mold for curing the part. Alternatively as shown in FIG. 17*b*, the sides may be foam filled with a heat expandable resin foam 606**.

The one piece chassis side is a unitary structure without joints. Metal parts or elements may be molded into the sides, the sides may be filled with foam or other suitable substances, and protrusions, as shown in FIG. 11, may be formed in the sides to serve as attachment and bonding points for the cross-members. Additionally, one or more shell reinforcing ribs 301 made from composite material may be molded in, or added after cure, and bridges across the hollow interior of the chassis side to provide additional strength and gluing points. In addition, the ribs 301 may be used as attachment and positioning points for metal inserts.

Figure 3:
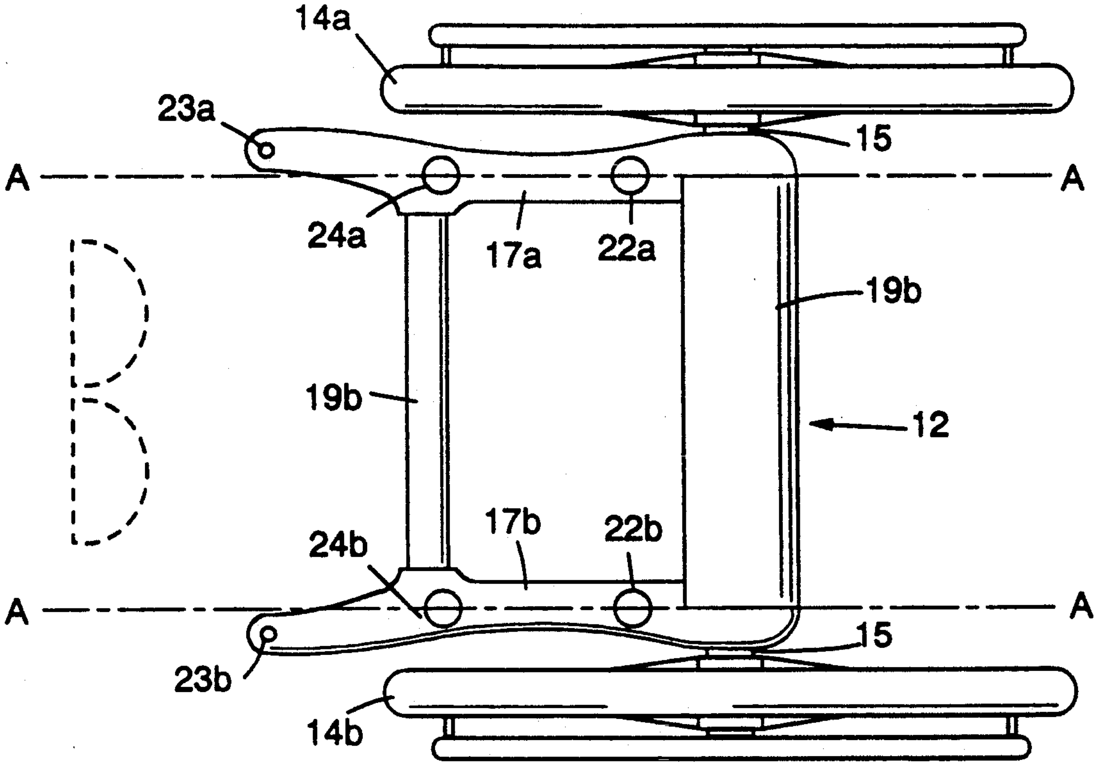
FIG. 3 is a top plan view of a chassis of the present invention and the drive wheels of the FIG. 1 wheelchair with the seating system removed. The foot rests are shown in phantom to provide orientation in this view.

Referring to FIGS. 2 and 3, chassis 12 formed from composite material defines two longitudinal side rails 17*a* and 17*b* connected by at least one cross-bar 19*a* and 19*b*. The anterior ends of side rails 17*a* and 17*b* define torsion resistant forwardly and downwardly extending torsion arms 23*a* and 23*b*. Two swivel-mounted casters 16*a* and 16*b* are conventionally attached by snap-locks or similar devices to sleeves 9 of the arms 23*a* and 23*b*, and are thereby positioned anterior to the drive wheels 16*a* and 16*b*. The sleeve portion 9 of the arms 23 extends below the plane of the sides 17, and the composite material in the arms 23 provides known vibration and shock attenuation functions for the wheelchair. The composite material of the chassis 12 causes the flexible and resilient arms to yield slightly under a vertically directed impact. The arms 23 individually react to impact and may strain and flex slightly to maintain the alignment of the upper frame portion of the chassis formed by the cross-bars 19 and the sides 17.

Composite materials are known to be lightweight, strong, resilient, corrosion resistant and moldable. The amount of resilience can be preselected during manufacture using techniques well established among those skilled in the art of composite materials. For example, the chassis may be formed from fiber-resin unidirectional tape of a selected fiber composition, alignment and density thereby preselecting the shock attenuation properties of the chassis for a predetermined impact direction. The chassis sides 17 and cross-bars 19 are hollow or foam filled shells thereby creating alightweight chassis having the option of including hollow spaces for stored components, such as battery driven drive motors. Referring to FIG. 13, a generally C-shaped rear cross-bar 19*a* is shown in cross section having a shell "c" and defining an interior hollow space "h" which may be fitted with two battery powered drive motors (not shown) for independently driving the drive wheels 14. Alternatively, the cross-bars may be metallic.

The position of the arms 23 in relationship tot he longitudinal sides 17 may be preselected to create an acute angle from approximately 5 degrees to 20 degrees. The angle makes it easier to closely approach the seat of the wheelchair; and, the acute angle forms a space between the arms and underneath the chassis and seat. The space may be used for storage or for wheel chair auxiliary equipment such as a power supply or other electronic components. The arms 23 are anterior to the cross-bars 19 and are self-supporting. The space created by the anterior self-supporting arms 23 enables the leg rest assembly 82 of the wheelchair to be adjusted and positioned throughout the space so that the user's knee angle may be adjusted, the seating assembly may be closely approached, and the leg rest assembly 82 may be folded through the space and positioned beneath the seating system. The details of the leg rest assembly 82 are described in Applicants' co-pending U.S. patent application Ser. No. 07/515,120, filed on Apr. 27, 1990, of entitled "Leg Rest Assembly for a Wheelchair", and hereby incorporated by reference into this application. In addition, the arms 23 are offset radially from the centerline "A" of the sides 17 as shown in FIG. 3. The composite material of the arms may be tailored to selected specifications for lateral and vertical deflection under impact. Lateral deflection may be tailored to approximately zero to 10 degrees, and vertical deflection may be tailored to approximately ⅛ to 10 degrees. Vertical deflection is measured from a 90 degree angle from the anterior-most cross-bar to the caster attachment point of the arm. The torsion resistant arms 23 limit rotation of the arms under stress thereby maintaining wheel alignment. As shown in FIG. 19, the radially offset arm 23 has a locus of torsion resistant "T". Rotation may be independently tailored and limited to approximately zero to 10 degrees.

The overall length of the longitudinal side 17, including the arm portion 23, may be from approximately 8" to 24" and is measured from the pivot axle of the attached caster wheel at the sleeve 9 to the drive wheel axle attachment point 27 on the chassis. The length may be preselected according to desired stability specifications with the ratio of the arm 23 length to the supported longitudinal side 17 length being approximately 55% and selectable from approximately 30% to 70%. The width of the chassis may be preselected and the length of the cross-bars accordingly adjusted from approximately 10" for child's use to approximately 30".

Figure 4:
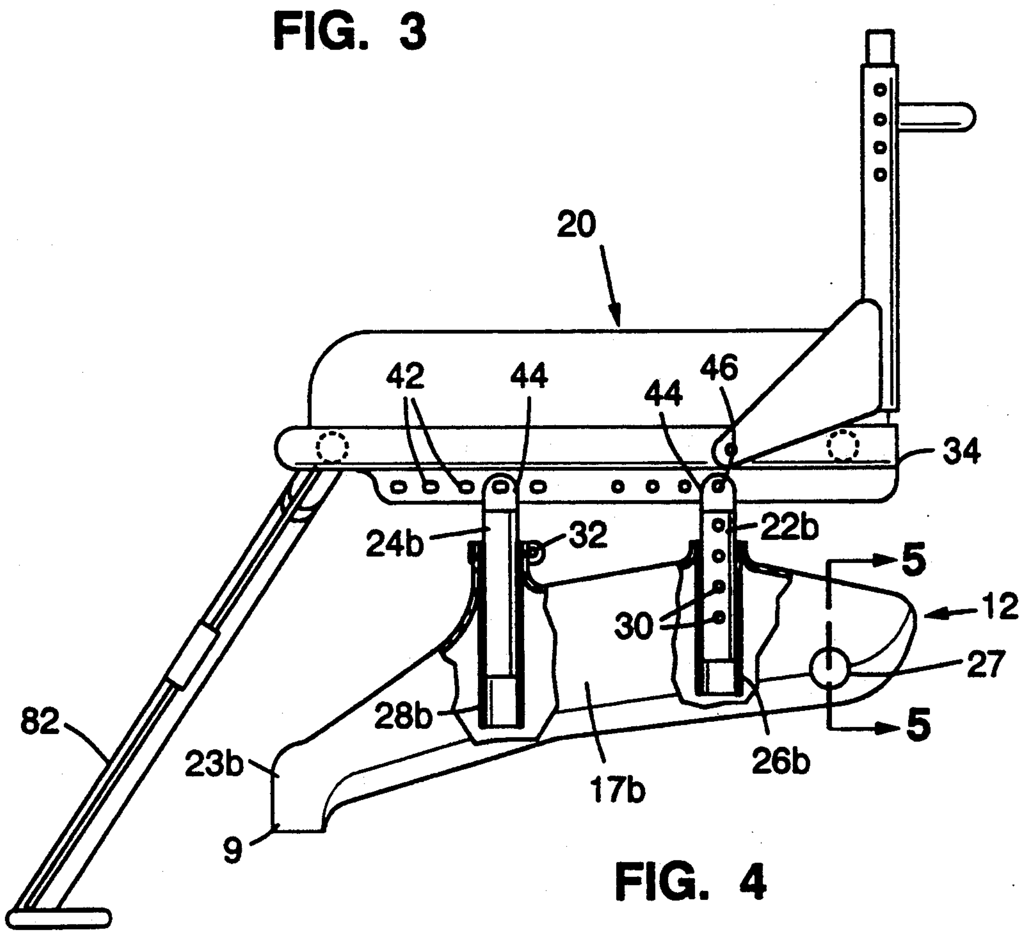
FIG. 4 is a somewhat diagrammatic side detail view in elevation and section of the FIG. 1 wheelchair showing the adjustable seat attachment mechanism of the chassis in greater detail.

The seating system 20 is demountably attached to the chassis 12 by four mounting posts: two rear posts 22*a* and 22*b* and two forward posts 24*a* and 24*b* which telescope upwardly from within the molded chassis structure 12. The rear posts 22*a* and 22*b* adjustably telescope along an upward locus within the two rear tubes 26*a* and 26*b* within the chassis 12, while the forward posts 24*a* and 24*b* telescope within two forward tubes 28*a* and 28*b* as shown in FIGS. 3 and 4. The four tubes 26*a*, 26*b*, 28*a*, and 28*b* each define an upper, annular neck portion 25. The details of the seating system 20 attachment mechanism are described in Applicants' co-pending U.S. patent application Ser. No. 07/515,119 filed on Apr. 27, 1990, entitled "Seating system for a Wheel Chair", now U.S. Pat. No. 5,076,602, which is hereby incorporated by reference into this application.

Referring now to FIGS. 5 and 6, a longitudinal sectional view of a drive wheel attachment mechanism is shown generally at 27. The attachment mechanism 27, one for each longitudinal side 17, is a cylindrical recess 29 within the outer surface of side 17. The cylindrical recess 29 initiates at a notched bracket portion 35 of the outer surface of contoured side 17, and terminates at a molded-in plate 31, shown in FIG. 5*b*, bearing a pattern of holes 33. A mating pattern of holes (not shown) are included on a wheel axle alignment plug 90 which is inserted into recess 29 for mounting the drive wheel axle 15. Alternatively, as shown in FIG. 5*c*, a keyway mechanism may be formed in the plate 31 for attaching the plug 90. The details of the camber attachment mechanism of the chassis 12 are described in Applicants' co-pending U.S. patent application Ser. No. 07/516,057, filed on Apr. 27, 1990, entitled "Camber Adjustment Fitting for a Wheelchair", and hereby incorporated by reference into this application.

In yet another aspect of the present invention shown in FIG. 9, the mounting rails (not shown) and 400*b* for the seat assembly are molded as plates in the inside surface of the longitudinal side rails 170*a* and 170*b* of the chassis 120. The metallic plates 400 are bonded into the chassis 120 during its construction, or may be attached by rivets. A multitude of holes 421 are included to align with mating holes 421 in a seat bracket 425. The details of this aspect are described in Applicants' co-pending U.S. patent application Ser. No. 07/516,048, filed on Apr. 27, 1990, entitled "Modular Wheelchair", and hereby incorporated by reference into this application.

Although the presently preferred embodiment of the invention has been illustrated and discussed herein, it is contemplated that various changes and modifications will be immediately apparent to those skilled in the art after reading the foregoing description in conjunction with the drawings. Accordingly, it is intended that the description herein is by way of illustration and should not be deemed limiting the invention, the scope of which being more particularly specified and pointed out by the following claims.

We claim:

1. A method for forming a molded composite chassis for a lightweight modular wheelchair comprising the steps of:

providing first and second mold assemblies for forming a pair of longitudinal side portions of a wheelchair chassis, each mold assembly having a shape to form a means for receiving a caster assembly at one end of each side portion, each mold assembly having a shape to form means for receiving a drive wheel axle assembly on an outer side of each side portion, and each mold assembly having a shape to form at least one opening for receiving means for attaching a seat at a top side of each side portion;

introducing first fiber-reinforced material into said mold assemblies for forming said pair of longitudinal side portions of said wheelchair chassis; and, connecting said side portions to each other with a bridge member.

2. A method for forming a molded composite chassis for a lightweight modular wheelchair according to claim 1, including forming each of said longitudinal side portions such that said one end is defined by an arm portion that is outwardly angled relative to an axis of the side portion.

3. A method for forming a molded composite chassis for a lightweight modular wheelchair according to claim 1, including forming on an inner side of said pair of longitudinal side portions means for securing said side portions to said bridge member.

4. A method for forming a molded composite chassis for a lightweight modular wheelchair according to claim 3, including inserting a mounting boss into said means for securing prior to connecting said side portions to each other, and engaging said bridge member with said mounting boss during said connecting step.

5. A method for forming a molded composite chassis for a lightweight modular wheelchair according to claim 2, including forming each arm of each longitudinal side portion such that each arm is oriented outwardly from an axis of said longitudinal side portion at an angle between 5 degrees and 20 degrees.

6. A method for forming a molded composite chassis for a lightweight modular wheelchair according to claim 1, including introducing additional fiber-reinforced material at preselected areas of said mold prior to introducing said first fiber-reinforced material, so as to providing reinforcement at said preselected areas.

7. A method for forming a molded composite chassis for a lightweight modular wheelchair according to claim 1, wherein said first fiber-reinforced material is introduced using a reaction injection molding method.

8. A method for forming a molded composite chassis for a lightweight modular wheelchair according to claim 1, wherein said step of introducing the first fiber-reinforced material includes introducing the first fiber-reinforced material into the mold assemblies using a hand layup molding method and applying internal pressure in the mold assemblies by inflating an inflatable molding device.

9. A method for forming a molded composite chassis for a lightweight modular wheelchair according to claim 1, wherein said mold assemblies each include two halves for forming two segments of each longitudinal side portion, and including the step of joining said two segments prior to said connecting step to form each longitudinal side portion.

10. The method according to claim 1, wherein said bridge member that connects said side portions to each other has a length, and including the step of selecting the length of the bridge member to provide a chassis having a desired width.

11. The method according to claim 1, wherein said bridge member has a length, and including the step of adjusting the length of the bridge member so that a chassis of desired width can be produced.

* * * * *